April 13, 1943.    J. A. C. YULE    2,316,644
PHOTOMECHANICAL SCREEN
Filed Nov. 18, 1941
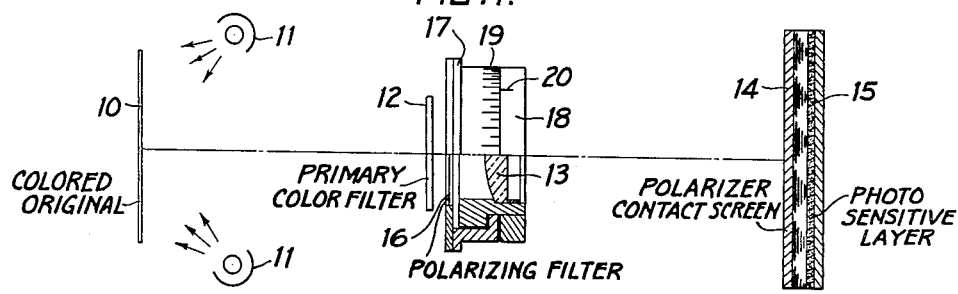
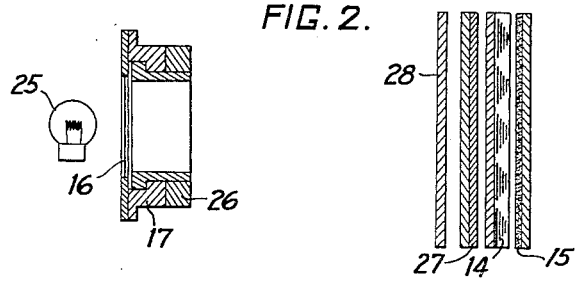
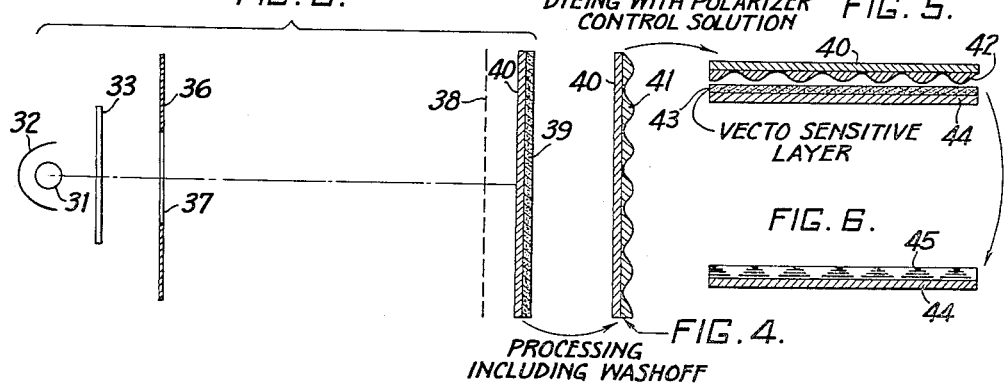
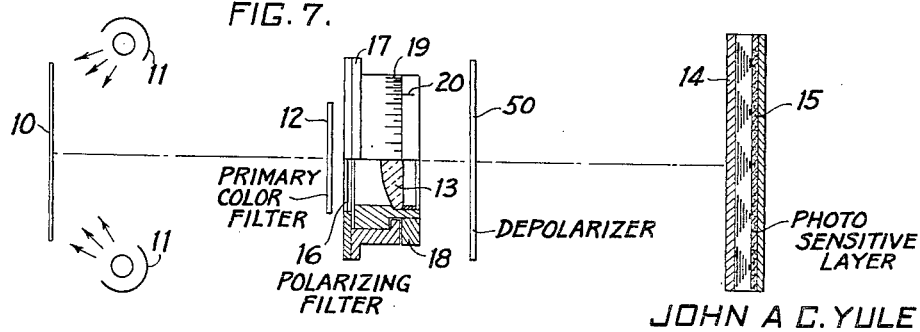
JOHN A C. YULE
INVENTOR
BY Newton M Perrins
ATTORNEY Patented Apr. 13, 1943

2,316,644

UNITED STATES PATENT OFFICE 2,316,644

PHOTOMECHANICAL SCREEN

John A. C. Yule, Rochester, N. Y., assignor to Eastman Kodak Company, Rochester, N. Y., a corporation of New Jersey Application November 18, 1941, Serial No. 419,596
In Great Britain June 6, 1941

2 Claims. (Cl. 95—81)

The present invention relates to methods of contrast control in photographic reproduction and is most useful in connection with photomechanical reproduction.

In my copending application, Serial No. 330,566, filed April 19, 1940, a method of contrast control is described. Primarily, the method consists of placing a screen in contact with a photosensitive layer on which the image is to be printed and then varying the amount of light transmitted by the screen in proportion to the contrast desired. The screen elements each include dense and less dense areas and the factor varied is actually the ratio of the amounts of light transmitted by these areas, i. e., the apparent contrast of the screen. In halftone reproductions, the screen is vignetted and varying this ratio (apparent contrast) varies the rate of change of dot area with exposure. In continuous tone reproductions the contrast change is marked only when the exposure through the dense areas is so small as to be on the toe and underexposed or even unexposed portions of the characteristic curve of the photosensitive layer used.

Since contrast control finds its greatest use in connection with vignetted screens which constitute contact halftone screens, the present specific invention is not concerned with the other phenomenon and it will not be discussed here. The advantages of contact halftone screens have been known for many years, and one of their disadvantages was the inability to control contrast when using such screens. The process disclosed in the above-mentioned application provides one method of controlling contrast with the screens. The example given in that application is a colored screen whose light transmitting properties are varied by varying the color of the light incident thereon. The preferred form of colored screen is one which is non-diffusing optically as taught by Murray in application, Serial No. 330,567, also filed April 19, 1940. The present invention is an alternative way of realizing this broad invention for contrast control, and the present invention has many unique advantages.

It is an object of the invention to provide a method of controlling contrast with a vignetted halftone screen and to provide a screen for the practicing of this method. A copending application 419,595 which I filed concurrently herewith relates specifically to the method.

It is a specific object of the present invention to provide proper tone rendition when making a black-and-white copy of any type of original record including multicolored originals. More specifically it is to give the same tone rendition at all contrasts.

When making color separation negatives or positives from a multicolored original, the color of the printing light is of necessity limited to the color of the separation required; for example, to one of the primary colors and cannot be varied. It is an object of the present invention to provide a method and screen for controlling contrast with a vignetted screen when making color separations.

Although contrast control can be obtained when using sharp screens in contact with the sensitive surface, the advantages of the present invention are realized in those processes which must have vignetted screens and the present application is limited to such screens. According to the invention, a vignetted halftone screen is made up in which the elements are graded substantially continuously in light polarizing power from the centers to the corners of each element. Various forms of polarization are known and the present screens may have many of these forms; for example, the corners of the elements may be elliptically or circularly polarized and the centers of the elements unpolarized, or the type or direction of polarization may vary from the corners to the centers. However, the preferred embodiment of the invention employs a screen which varies from unpolarized at the corners to plane polarized at the center of each element. According to the invention, this vignetted polarizing halftone screen is placed in contact with a sensitive surface which is in printing relation to the continuous tone record to be reproduced which is either a monochrome or a multicolored record. The printing relation may be either for contact printing or projection printing. A polarizing filter is placed somewhere between the source of illumination and the screen, i. e., either between the source and the record or between the record and the screen. The apparent contrast of the screen and, hence, the contrast of the results, depends on the orientation of the polarizing filter. The higher the apparent contrast of the screen, the lower the resulting contrast in the halftone. According to the invention, the polarizing filter is rotated until the apparent contrast of the screen is inversely proportional to the contrast of the continuous tone record, in order to give uniform contrast or the desired contrast in the prints. The ratio of the amount of light transmitted by the corners of the screen elements to that transmitted by the centers is a measure of the apparent contrast.

The polarizing filter and polarizing screen have no effect on the color of the exposing light and hence the invention is particularly suitable when making color separation records. Thus according to the invention, a color separation halftone record is made from a multicolored original by filtering the exposing light through the proper primary color filter and by having a vignetted polarizing screen in contact with the photosensitive layer on which the color separation record is to be made, the contrast of the record being controlled by proper control of the polarization of the printing light.

If the photosensitive layer is a differentially sensitized monopack for making a black printer in accordance with United States Patent 2,183,524, Yule, the contrast of the black printer is excellently controlled by the present invention.

When employing the process any polarization of the light from the subject before it strikes the filter would introduce extraneous effects which may be undesirable. These may be eliminated by placing between the copy and the filter (i. e. in front of the lens in a projection printer) a strongly birefringent material to depolarize the light. Contrariwise, the depolarizer may be used as the control in which case it is placed between the filter and the screen which are fixed with their vibration axes mutually at right angles. With no depolarizing of the light, the apparent contrast of the screen is a maximum; with complete depolarization it is a minimum and is very low, the average gradient or density range being less than 0.3.

Different degrees of depolarization may be obtained by introducing different amounts of birefringent material between the filter and screen or by rotating a quarter wave plate in this position.

Colored vignetted screens used in the process taught by Serial Number 330,566, mentioned above, can be made by photographic processes and the present screens can be made by the corresponding vectographic processes. Such processes are described in the Journal of the Optical Society of America, vol. 30, June, 1940, and in the British Patent 528,796, assigned to International Polaroid Corporation. One particularly suitable method of making the present vectograph screens, is described below along with a detailed description of the invention which will be understood when read in connection with the accompanying drawing in which:

Fig. 1 illustrates a method of contrast control using the present invention.

Fig. 2 illustrates an embodiment of the invention applied to contact printing.

Figs. 3, 4, 5, and 6 constitute a flow chart illustrating a method of making a vectographic vignetted halftone screen.

Fig. 7 illustrates a variation of the embodiment in Fig. 1.

Fig. 1 illustrates the making of a color separation negative from a multicolored original 10 illuminated by white light from illuminators 11. Light from the original passes through a color filter 12 and is focused by an objective 13 onto a photosensitive layer 15 in contact with which is placed a vignetted polarizing screen 14 according to the invention. Between the filter 12 and the lens 13 is placed a polarizing filter 16 carried by a rotatable mount 17 rotatably secured to the lens mount 18. The orientation of the polarizing filter 16 is indicated by a scale 19 on the mount 17 against an index 20 on the lens mount 18. In practice the color filter 12 is often placed between the lens elements but is here shown spaced from the lens for clarity.

In the screen 14, the elements are continuously graded in light-polarizing properties from the corners to the centers thereof and this is indicated schematically by lines of increasing length. The contrast of the resulting picture on the photosensitive layer 15 depends on the apparent contrast of the screen 14 and this depends on the orientation of the filter 16. The transmission of the unpolarized corners is constant as the filter 16 is rotated but that of the centers varies from zero to substantially equal to that of the corners so that the total light transmission is least when the apparent contrast of the screen is greatest. Therefore, according to the invention to decrease contrast, the polarizing filter 16 is rotated so that the axis of this filter is at right angles to the vibration axis of the screen elements. This makes the screen appear quite contrasty and hence gives low contrast results. If higher contrast is desired, the polarizing filter 16 is rotated until the vibration axes of the filter and screen are parallel. Intermediate orientations of the filter give intermediate contrasts. In practice the vectographic screens are so nearly perfect that parallel vibration axes make the apparent screen contrast so low that the resultant halftone contrast is actually beyond the useful range, even though not quite infinite.

Fig. 2 illustrates the invention applied to contact printing, and in this case the record 27 being copied is placed against the screen 14 and held there by a transparent plate 28. The printing exposure is provided by a light source 25 immediately in front of which is placed the polarizing filter 16 in its rotatable mount 17 carried on a support 26. Of course, in the contact printing arrangement, no lenses are necessary.

Figs. 3, 4, and 5 illustrate the making of a vignetted polarizing halftone screen. Illumination is provided by a lamp 31 having a reflector 32 and a diffusing plate such as an opal glass plate 33 through an aperture 37 in a mask 36. Light from this source passes through a ruled halftone screen 38 placed at halftone distance from a sensitive layer 39 carried on a support 40. The exposure is through the support 40 and may be varied directly or by any of the usual methods, such as changing the shape of the aperture 37 or by making a succession of exposures through different apertures. The photosensitive layer 39 is of the wash-off relief type and is processed in the usual wash-off manner to give a relief image 41 mounted on the base 40. The wavy line in this case is intended to represent actual physical appearance of a cross section; and for this reason similar lines are not used in representing degrees of polarization such as element 14 of Figs. 1 and 2 and element 45 of Fig. 6.

In accordance with the usual method of making vectographs this relief image is then dyed with a polarizing control solution so that it provides a polarizing control layer 42 in which the distribution of the solution is proportional to the exposure through the screen 38. This relief polarizer control layer 42 is then pressed into intimate contact with a vecto sensitive layer 43 mounted on a support 44, and gives a vectograph 45 which constitutes a vignetted polarizing halftone screen. In one form of vectograph production, the vecto sensitive layer 43 is polarized and the polarization is destroyed by the polarizer control solution. The polarization is completely destroyed (sometimes called "bleached")

or practically so at those points which receive the maximum amount of polarizer control solution. On the other hand, the low points in the relief 42 provide practically no polarizer control solution and, hence, the polarization of the layer 43 remains a maximum at these points. The present invention is not limited to the vectographic process used for the production of the vignetted screen but of the processes disclosed in British Patent 528,796, accepted November 7, 1940, the one just described appears to be the most satisfactory for the present case. The other standard method employs an "ink" (polarizing control solution) which produces proportional polarization in an oriented sheet leaving unpolarized the points which receive no solution.

In Fig. 7, the filter 16 and the screen 14 are preferably fixed relative to one another with their vibration axes crossed. A depolarizer 50 such as a rotatable quarter wave plate is placed between the filter and screen so that the apparent contrast of the screen is controlled by controlling the amount of depolarization. Thus the amount rather than the direction of the polarization is the control factor in this embodiment.

Having thus described various embodiments of my invention, I wish to point out that it is not limited to these arrangements but is of the scope of the appended claims.

What I claim and desire to secure by Letters Patent of the United States is:

1. A contact halftone screen comprising elements which are graded substantially continuously in light polarizing power from the centers to the corners thereof, and a transparent support for the elements.

2. A contact halftone screen comprising elements which are graded substantially continuously from strongly plane polarizing in the centers to substantially non-polarizing in the corners thereof and a transparent support for the elements.

JOHN A. C. YULE.